Sept. 8, 1931.  A. P. ARMINGTON  1,822,795
LAND VEHICLE
Filed March 15, 1930   2 Sheets-Sheet 1
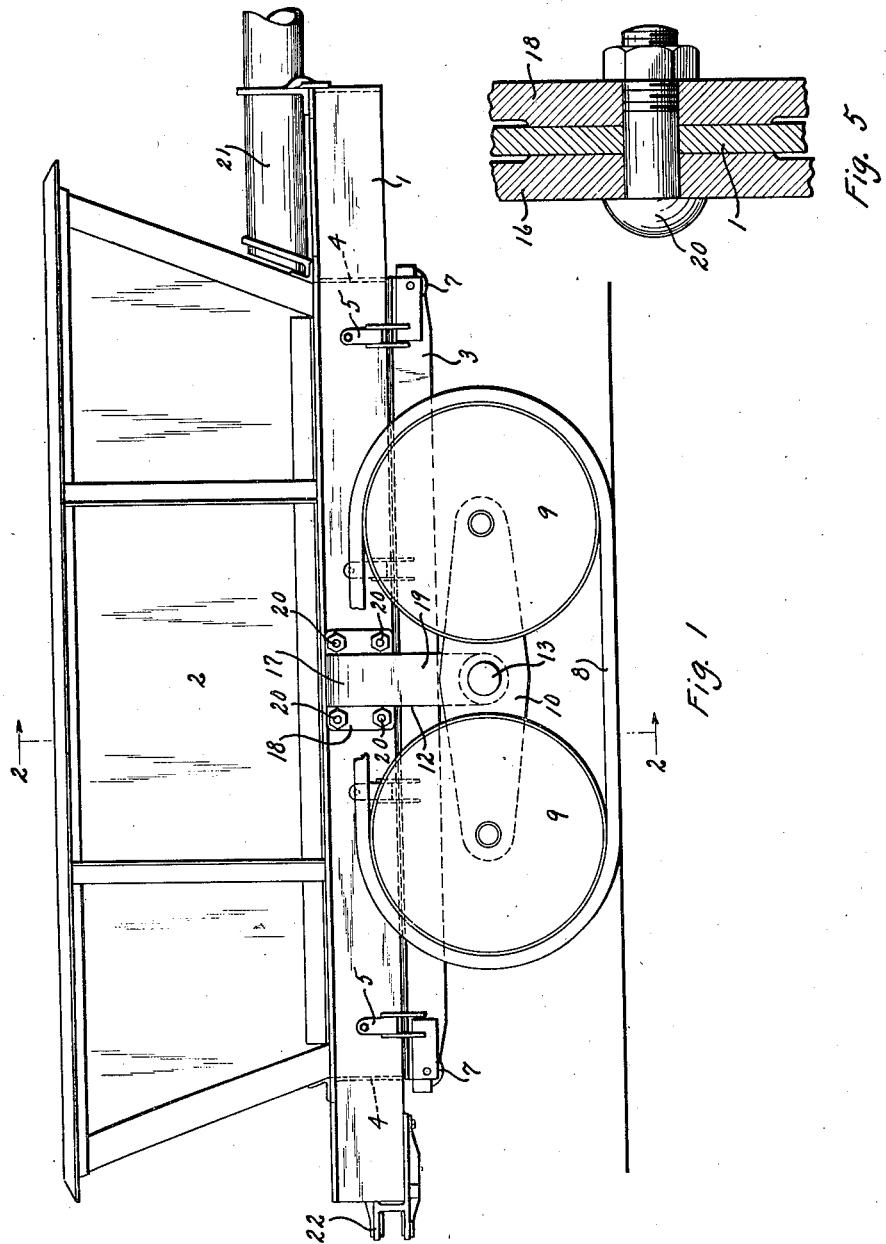
INVENTOR
Arthur P. Armington
BY
Brockett, Hyde, Higley & Meyer
ATTORNEYS Sept. 8, 1931.    A. P. ARMINGTON    1,822,795
LAND VEHICLE
Filed March 15, 1930    2 Sheets-Sheet 2

INVENTOR
Arthur P. Armington
BY
Brockett, Hyde, Higley & Meyer
ATTORNEYS

Patented Sept. 8, 1931

1,822,795

UNITED STATES PATENT OFFICE

ARTHUR P. ARMINGTON, OF WILLOUGHBY, OHIO

LAND VEHICLE

Application filed March 15, 1930. Serial No. 436,069.

This invention relates to heavy-duty bottom-dump trailer-wagons.

Such a wagon includes as its principal parts a load container-body, mobile supporting means therefor, and draft hitch means secured with the body.

The body may be of all metal construction, and if so may preferably comprise an open-bottom hopper with a frame at its base, and dumping doors associated with the frame to control dumping of the load from the hopper.

The mobile supporting means for the body is preferably of the single-axle two-wheel type as compared to the double-axle four-wheel type, so that the vehicle is of the cart type as distinguished from the wagon type. Preferably also endless tread linkages are employed as wheel substitutes; so that the supporting means will comprise generally, axle means located medially of the ends of the body, and endless tread running gear associated with the axle means.

Since the body is provided with bottom dump doors it must be supported in a position sufficiently elevated that the doors may clear the ground when in dumping position; and since the load is dumped beneath the body the axle means by which the body is supported must be arched to clear the dumped load, if the rolling elements of the running gear are to be of economically small diameter.

The draft hitch means are secured with the body as at one or both ends thereof and adapted for coupling with a draft vehicle or a following vehicle whereby propulsion is had, and the body is at the same time maintained by the coupling against fore-and-aft tilting.

Where a single axle is to support the entire weight of the body with its load, and particularly where the axle is arched as described the axle design presents numerous difficulties. Its association with the body must be ample to support the weight and contents thereof as dead load, yet it is also essential that no bending strains, resulting from a tendency of the axle to spread, be transmitted to the body, that the latter may be of reasonably light construction.

The object of this invention is to provide, in a wagon of the class described and having such structural features as described, an improved axle structure of simplicity and superior strength, and cooperative in a novel manner with the wagon body to support the same without transmitting any axle strains thereto.

Figure 3:
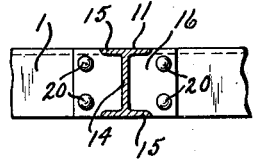
Figure 4:
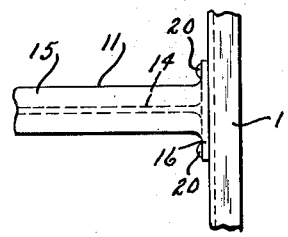
Figure 2:
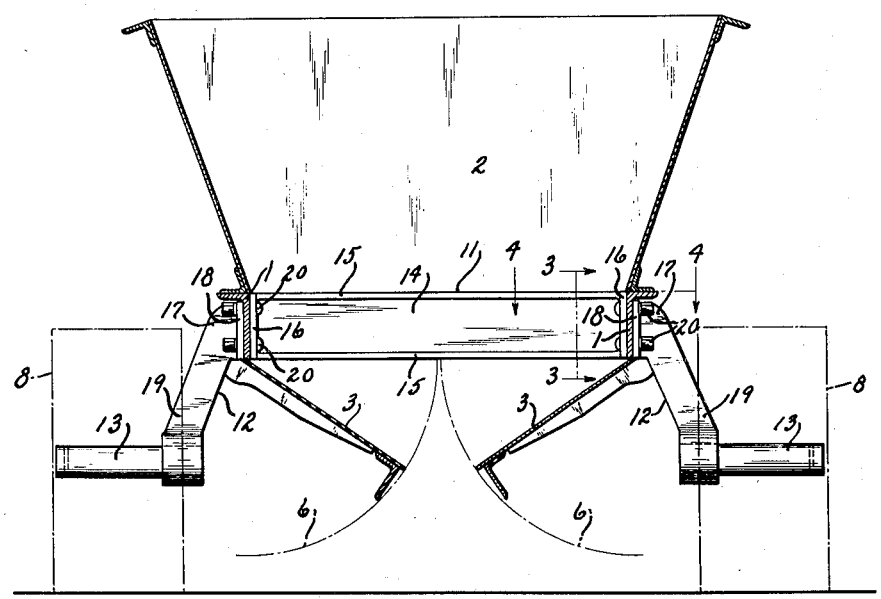

The exact nature of the invention together with further objects and advantages thereof will be apparent from the following description, taken in connection with the accompanying drawings, in which Fig. 1 is a side elevation indicating more or less conventionally pertinent parts of a wagon constructed according to my invention, with the dumping doors thereof shown as in closed position but their operating gear, being immaterial, not appearing; Fig. 2 is a sectional elevation of the same as in the transverse plane of line 2—2, Fig. 1, but showing the doors as in partially opened position; Figs. 3 and 4 are detail views as in the planes of lines 3—3 and 4—4, Fig. 2; and Fig. 5 is an enlarged detail view of cooperating faces of axle parts showing an alternative construction as will appear.

With reference now to the drawings the body of the wagon shown includes an open rectangular frame of suitable structural steel members, such as the side members 1 of angle section indicated in Fig. 2, and a hopper 2 carried by the frame to dump therethrough. The frame also includes transverse members 4 arranged at the ends of the hopper so that the hopper may rest upon the frame as indicated in Fig. 2 and the frame will provide a container portion below the hopper. Thus the doors 3 may be arranged to close against the frame, to control dumping of a load contained within both hopper and frame. To this end the doors are hung upon the side frame members 1 as by link connections indicated at 5, to swing thereupon downwardly and outwardly to depending open dumping position, and thence inwardly and upwardly to horizontal closed position against the frame, as indicated by the broken lines 6, Fig. 2. Control of the doors may be had by suitable winding mechanism including rigging (not shown) passing over the sheaves 7, all as will be well understood by one familiar with the art.

Mobile supporting means for the body, including running gear of "crawler" type, are provided, and as conventionally shown comprise as principal elements, on either side of the body, an endless tread 8 trained about paired wheels 9 carried by a beam 10.

The body is supported on this running gear by axle means including as its principal parts a brace or reinforcing member 11, a pair of brackets 12, and stub shafts 13 carried by the brackets; which parts in assembly with the frame comprise a built-up arched axle as will appear.

The member 11 is a rigid member extending across the body and in the form shown between the side frame members 1, intermediate the container ends, with its end portions abutting against these side members. The reinforcing member shown is of I-section as indicated particularly in Fig. 3, having a characteristic upright web portion 14 extending between top and bottom flange portions 15. At its ends the reinforcing member is provided with transversely extending abutment members designed for presentation to the inner surfaces of the side frame members and to abut and apply pressure thereto over an extended area for increasing rigidity, as will appear. In the arrangement shown the member 11 is provided at each end with an end flange or plate-like abutment member 16, preferably connected with the web and flanges 14 and 15 of the I-section, and providing an abutment surface or surfaces of wide area bearing against the side frame members 1, the length of the reinforcing member being proper for the purpose.

The brackets 12 are located on the outside of the body each opposite to an end of the reinforcing member 11; each bracket having a head portion 17 including a transversely extended plate-like abutment or flange portion 18 corresponding with the like flange portion 16 of the reinforcing member, and providing on each bracket an abutment surface opposite to that of the corresponding end of the reinforcing member and of like wide area. Each bracket also has an arm portion 19 extending downwardly from the body and carrying at its lower end its stub shaft 13 outwardly extending thereof.

Each bracket is secured to its end of the reinforcing member 11, with the intervening body side-member portion clamped between their transversely extending wide area abutment portions by any suitable tie or clamping means. The tie means shown for illustration in Fig. 2 comprises through bolts 20 as indicated, although equivalents thereof may be employed such as stud bolts threaded into the parts, or rivets. At any rate the tie means shown extends across or through the side frame member from plate to plate to be stressed in any manner to firmly clamp the frame side members between the axle parts and to resist spreading of the stub shaft ends of the brackets 12. The tie means usually also is arranged to be stressed in shear to support the load of the frame and parts carried thereby. More particularly and with reference to Figs. 1, 2, and 3, the lower pair of bolts 20 are located below the plane of the neutral axis of moments through the center of sectional area of the brace member 11, which location is also below the central plane of the member where the latter is symmetrical in section. Thus loading of the axle, resisted by these lower bolts stressed in tension, results in a clamping effect upon the body side member portions thereabove. The particular function of the upper pair of bolts 20 therefore becomes to resist cranking stresses in the axle caused by draft applied to the vehicle. Obviously then, considering only the axle construction, a simple "C" clamp, as extending around below or even above the frame instead of therethrough, could be substituted for the lower bolts 20, and would accomplish the identical result as to clamping effect upon the body side member. By the described clamping effect, however, particularly with the wide area flanges 16, 18, the shear loads upon the tie means are much reduced and at the same time this construction positively relieves the side frame members of any twisting stresses transmitted from the axle, so that substantially the side frame members serve only as beams to support the container load and resist cranking motion of the axle brackets.

The cooperating opposed end portions of the reinforcing member and of the bracket head portions may be finished throughout their wide areas; or if desired and in order to save machining costs, the surfaces may be provided with more or less widely separated bosses so that only the boss areas need be finished. Fig. 5 illustrates such bosses as located at the tie bolts 20.

The stub shafts 13 are fitted in simple bearings in the beams 10 of the running gear; so that the body may tilt upon the running gear, or if the body be maintained horizontal the running gear may accommodate itself to unevenness in the roadway by rocking of the beam upon the stub shafts.

At the front end of the vehicle suitable hitch means including a tongue member 21 are secured with the frame for providing draft connection and to maintain the wagon body in upright position on the running gear. At the rear of the frame hitch means 22 may be provided, that the wagon may be employed in a train with similar wagons.

What I claim is:

1. In a dump wagon an open-bottom body having side members, a brace member extending across the body between its side members, a bracket member on the outside of each side member and having an arm extending downwardly therefrom and carrying a stub shaft, the portions of said brace and bracket members at each body side member having flanges extending over a substantial area of the body side member and lying in registration with each other on opposite sides of the side member, and securing means connecting said flanges.

2. In a dump wagon an open-bottom body having side members, a brace member extending across the body between its side members, a bracket member on the outside of each side member and having an arm extending downwardly therefrom and carrying a stub shaft, the portions of said brace and bracket members at each body side member having flanges extending over a substantial area of the body side member and lying in registration with each other on opposite sides of the side member, and securing means connecting said opposed flanges, and comprising tie means extending therethrough and through the intervening body side portion, whereby the brace and bracket members with the side member portions therebetween are confined in arched axle form.

3. In a dump wagon, an open bottom body having side members, a brace member extending across the body between its side members, a bracket member on the outside of each side member and having an arm extending downwardly therefrom and carrying a stub shaft, the terminal portions of said brace and bracket members at each body side member having abutment portions extending transversely to the brace member over an extended area of the body side member and lying in registration with each other on opposite sides of the side member, and securing means connecting said abutment portions below the plane of the neutral axis of stress of the brace to confine the body side members with and between the brace and bracket members in arched axle form.

4. In a dump wagon having an open-bottom body with side members, arched axle means for supporting the body in elevated position, and comprising a rigid brace member extending across the body and provided at each end with an abutment presented to a side member thereof, a bracket located on the outside of each side member and provided with an abutment presented thereto opposite the corresponding abutment of said brace and having a portion extending downwardly from the body and carrying a stub shaft, and means securing each bracket to its corresponding end of the brace below the central plane of the brace, whereby the intervening body side member will be clamped between the corresponding opposed abutments as the axle is loaded.

5. In a dump wagon having an open-bottom body with side members, arched axle means for supporting the body in elevated position, and comprising a rigid brace member extending across the body and provided at each end with an abutment presented to a side member thereof, a bracket located on the outside of each side member and provided with an abutment presented thereto opposite the corresponding abutment of said brace and having a portion extending downwardly from the body and carrying a stub shaft, and means securing each bracket to its corresponding end of the brace below the central plane of the latter, and comprising tie means arranged below said plane and extending between the opposed abutments and through the body side member therebetween.

6. In a dump wagon of the class described and having an open-bottom body with side members, arched axle means for supporting the body in elevated position, and comprising a reinforcing member of I-section extending across the body and provided at each end with a transverse plate-like abutment member connected with the web and flanges of the I-section to provide an extended area for presentation to the adjacent side member of the body, a bracket located on the outside of each side member and provided with a transverse plate-like abutment member corresponding to that of the reinforcing member and presenting opposite thereto to the side member an extended area and having arm portions extending downwardly from the body and carrying stub shafts, and means attaching each bracket to the corresponding end of said reinforcing member with the intervening side member clamped between the abutments of the parts, and comprising tie means securing together adjacent abutment portions of the parts and extending through the body side member therebetween.

In testimony whereof I hereby affix my signature.

ARTHUR P. ARMINGTON.